(12) United States Patent
Hoffman et al.

(10) Patent No.: US 8,522,926 B2
(45) Date of Patent: Sep. 3, 2013

(54) APPARATUS AND METHOD FOR LUBRICATING PRESSURE RELIEF VALVES

(75) Inventors: Karl K. Hoffman, Arlington Heights, IL (US); Steve Kaganovich, Northbrook, IL (US); Thomas J. Roberts, Bolingbrook, IL (US)

(73) Assignee: Plitek, L.L.C., Des Plaines, IL (US)

( * ) Notice: Subject to any disclaimer, the term of this patent is extended or adjusted under 35 U.S.C. 154(b) by 764 days.

(21) Appl. No.: 11/504,947

(22) Filed: Aug. 16, 2006

(65) Prior Publication Data

US 2008/0041663 A1    Feb. 21, 2008

(51) Int. Cl.
*F16N 13/22* (2006.01)
*B05B 13/02* (2006.01)
*B31B 1/84* (2006.01)
*B65B 61/00* (2006.01)

(52) U.S. Cl.
USPC ......... 184/15.3; 118/325; 493/213; 53/128.1; 53/410; 53/434

(58) Field of Classification Search
USPC ....... 184/6.26, 11.5, 15.3, 58, 50.2; 383/100, 383/103; 426/395; 53/123.1, 410, 128.1, 53/434, 512; 493/213, 929; 118/325
See application file for complete search history.

(56) References Cited

U.S. PATENT DOCUMENTS

| | | | | |
|---|---|---|---|---|
| 467,977 A * | 2/1892 | Metzger | ......................... | 493/231 |
| 1,529,134 A * | 3/1925 | Kelter | ........................... | 118/325 |
| 2,381,510 A * | 8/1945 | Muldoon | ...................... | 362/191 |
| 2,946,502 A * | 7/1960 | Metzger | ......................... | 383/94 |
| 3,146,902 A * | 9/1964 | Voelker | ......................... | 414/414 |
| 3,785,456 A * | 1/1974 | McIntire et al. | ............... | 184/6.1 |
| 4,035,988 A * | 7/1977 | Daniels | ........................... | 53/562 |
| 4,122,993 A * | 10/1978 | Glas | ........................ | 383/103 |
| 4,256,806 A * | 3/1981 | Snyder | ......................... | 428/378 |
| 4,274,509 A * | 6/1981 | Thomson et al. | ........... | 184/15.3 |
| 4,290,253 A * | 9/1981 | Domke et al. | .................. | 53/410 |
| 4,690,667 A * | 9/1987 | Domke | ........................ | 493/213 |
| 4,719,126 A * | 1/1988 | Henery | ........................ | 427/165 |
| 5,048,846 A * | 9/1991 | Ichikawa | ..................... | 220/89.1 |
| 5,178,023 A * | 1/1993 | Domke et al. | ............... | 73/865.9 |
| 5,277,741 A * | 1/1994 | Kramer | ......................... | 156/353 |
| 5,427,839 A * | 6/1995 | Buchner et al. | ............... | 428/192 |
| 6,264,743 B1 * | 7/2001 | Cucuzza | ......................... | 118/50 |
| 7,328,543 B2 * | 2/2008 | Hoffman et al. | ............. | 53/128.1 |
| 7,685,793 B2 * | 3/2010 | Newrones et al. | .............. | 53/405 |

* cited by examiner

*Primary Examiner* — David D Le
*Assistant Examiner* — Terry Chau
(74) *Attorney, Agent, or Firm* — John S. Pacocha

(57) ABSTRACT

A lubricant applicator unit for pressure relief valves for a system for applying pressure relief valves to packaging during a packaging process, including a vacuum applicator for temporarily separating layers of the valve when the lubricant is applied. A pressurized nozzle sprays or atomizes the lubricant into the valve opening. Graphite suspended in liquid silicone is used as the lubricant; it is recirculated in a reservoir to keep the graphite in suspension. Optical sensors check for valves before the entrance to, and after exit from, the vacuum applicator.

13 Claims, 3 Drawing Sheets

US 8,522,926 B2

APPARATUS AND METHOD FOR LUBRICATING PRESSURE RELIEF VALVES

BACKGROUND OF THE INVENTION

1. Field of the Invention

This invention relates generally to the application of pressure relief valves to packaging for products such as coffee, and more particularly to an improved apparatus and method for the application of an oil or lubricant to such pressure relief valves.

2. Background Art

Pressure relief valves, such as the PLITEK PLI-VALV PV-28 pressure relief valves, are applied to packaging for products, such as coffee. These valves, which may be plastic or foil, are self-adhering, thin, low profile designs supplied on a non-tearing polyester liner. The valves have an adhesive on the back side which adheres them to the liner, until the valves are removed immediately prior to the application to the packaging, and then provides for affixing the valves to the packaging. An example of the technical properties of such valves is an opening pressure differential to pressure of 0.1375 psig (9.5 milibars) and valve closure occurs after pressure drops to 0.0375 psig (2.6 milibars). The valves vent unwanted gases and seal out atmospheric gases from rigid or flexible packaging. One advantage of such valves is that they allow coffee to be packed immediately after roasting and grinding to preserve freshness. Elimination of the holding required to allow coffee to degas saves time and money while ensuring that customers receive the highest quality coffee.

Such pressure relief valves are usually applied during the packaging process, more particularly, after the containers are formed and are being filled with the product. The packaging process may permit intermittent application of the valves, or may require that the valves be applied in a continuous operation. A system for the application of the valves generally includes a base unit, a set of guide rollers, electronic and pneumatic components, a valve lubricating unit, and a valve applicator unit. The base unit provides for advancing and indexing a liner strip carrying the pressure relief valves. Conveniently, the base unit may comprise an unwinder, a rewinder (for the empty liner after the valves have been applied to the packaging), electrical components, pneumatic components, control components, and a drive motor. Guide rollers are used to orient the running direction of the liner (generally vertical or horizontal), as needed to accommodate the packaging equipment in conjunction with which the pressure relief valve applying system is being used. Electronic equipment may include sensors and stepper motors, and the pneumatic components generally include a vacuum generator, regulators and filters for feeding the vacuum and pneumatic systems, as well as valves for operating pneumatic cylinders.

An oil or lubricant applicator unit, generally positioned proximate but prior to the valve applicator unit, provides lubricant to activate the pressure relief valve before it is applied to the packaging. The valve applicator unit conveniently comprises a punch, piercing needle, or some other device to make an opening in the packaging, a peeler bar assembly assisting in the removal of the pressure relief valve from the liner, and a valve applicator head for attaching the pressure relief valve to the packaging in operating register with the opening made by the punch, needle or other device. An example of such a prior art device is the ACCRAPLY Model 230 PRV Pressure Relief Valve Applicator. An improved valve applicator head for attaching the pressure relief valve to packaging in operating register with the opening made by the punch, needle or other device is disclosed and claimed in pending U.S. patent application Ser. No. 11/435,525 filed May 17, 2006.

A problem encountered in the prior art application of pressure relief valves to packaging is that the oil or lubricant is not consistently sufficiently distributed between the parts of the pressure relief valve. Prior art systems generally rely on capillary action to distribute a drop or dab of lubricant on the pressure relief valve. An example of such a prior art oil applicator comprises an EFD 752V Series Diaphragm Valve. However, such prior art applicators do not always provide sufficient distribution of the necessary oil or lubricant. Accordingly, there remains a need for a system with a pressure relief valve applicator for packaging in which the oil or lubricant is consistently sufficiently distributed between the parts of the pressure relief valve, before it is applied to the packaging.

SUMMARY OF THE INVENTION

The present invention is concerned with providing a system for applying a pressure relief valve to packaging during the packaging process, including a valve lubricating unit with a lubricant applicator, and a vacuum applicator positioned on one side of the pressure relief valve, proximate the lubricant applicator. A synchronizer may be included for applying a vacuum to the pressure relief valve as the lubricant is applied to the pressure relief valve, and for shutting off the vacuum applied to the pressure relief valve after the lubricant is applied to the pressure relief valve. The lubricant applicator may be a sprayer or an atomizer. A suspension of graphite in liquid silicone may be used as the lubricant. A reservoir containing the lubricant may be provided with a pump for recirculating the lubricant in the reservoir. The vacuum applicator may include a plate, having an entrance end and an exit end, across which a line of pressure relief valves move, with a pressure relief valve being positioned on the plate between the entrance end and the exit end. Sensors may be positioned proximate the entrance end and the exit ends of the plate for sensing the position of a pressure relief valve about to move onto the plate and the position of a pressure relief valve that has moved past the plate.

The present invention is also concerned with providing a method for applying a lubricant to a pressure relief valve during the process of applying the pressure relief valve to packaging, comprising the steps of supplying a pressure relief valve on a liner to be applied to packaging, moving the pressure relief valve on the liner into register with an operating vacuum, applying lubricant to the pressure relief valve on the liner, removing the lubricated pressure relief valve from the liner, piercing the packaging with a punch, needle or other device where the lubricated pressure relief valve is to be applied to the packaging to make an opening in a packaging, and putting the lubricated pressure relief valve removed from the liner on the package over, and in register with, the opening pierced in the packaging. The method may additionally include the steps of containing a supply of the lubricant to be applied to the pressure relief valve in a reservoir, and recirculating the supply of the lubricant in the reservoir. The operating vacuum may be applied to the pressure relief valve before, during, at the same time as, or after the step of applying the lubricant to the pressure relief valve. The operating vacuum may be removed from the pressure relief valve after the step of applying the lubricant to the pressure relief valve. Application of the lubricant to the pressure relief valve may include spraying or atomizing the lubricant as it is applied. Recirculation of the lubricant may be done during the process.

BRIEF DESCRIPTION OF THE DRAWINGS

For a better understanding of the present invention, reference may be had to the accompanying drawings in which.

DETAILED DESCRIPTION

Figure 1:
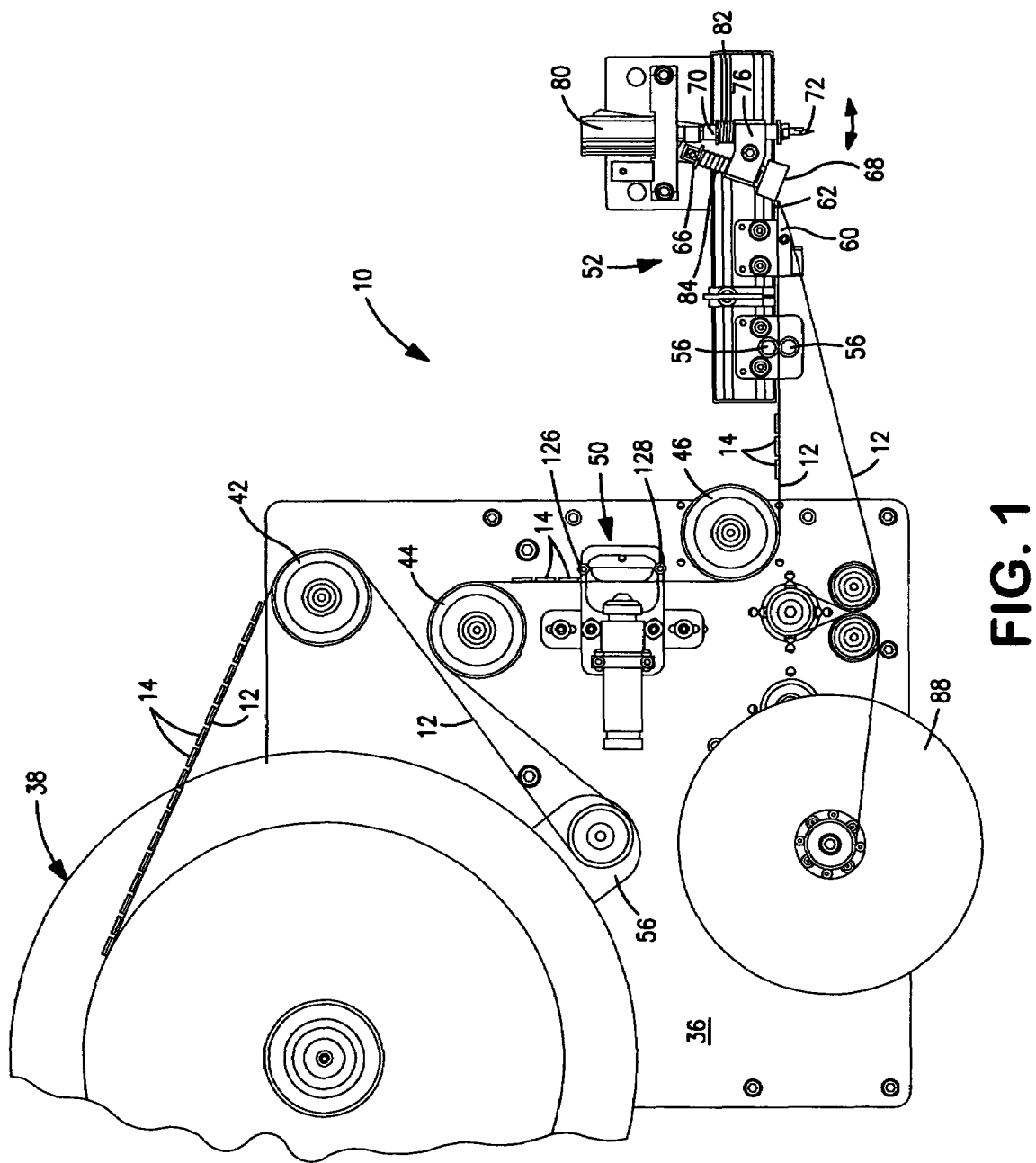
FIG. 1 is a top plan view of a pressure relief valve applicator system, including a base unit, a valve lubricating unit of the present invention, and a valve applicator unit.

The present invention relates to the field of systems for applying pressure relief valves to product packaging. A system 10 for applying lubricated pressure relief valves is generally shown in FIG. 1 as an attachment for a packaging line. The illustrated system 10 is designed to be attached to an intermittent fill and seal packaging machine (not shown) for the application of pressure relief valves such as the PLITEK PLI-VALV PV-28 pressure relief valves. However, the valve lubricating unit of the present invention may also be part of a system to be attached to a continuous fill and seal packaging machine for the application of pressure relief valves such as the PLITEK PLI-VALV PV-28 pressure relief valves. A liner 12 carries a series of pressure relief valves 14 for removal and application to the packaging. Such valves are conveniently spaced apart at regular intervals along the liner, as for example, at a one inch pitch between centers.

Figure 2:
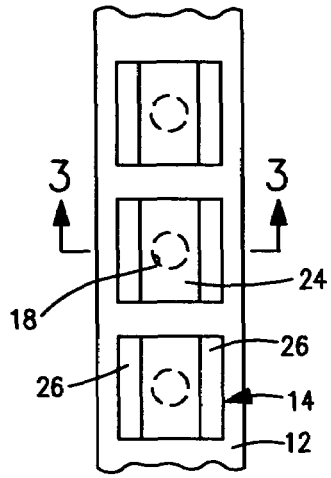
FIG. 2 is a top plan view of a fragment of a liner carrying a series of three exemplary pressure relief valves.
Figure 3:
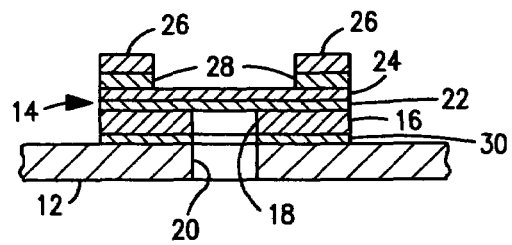
FIG. 3 is a vertical sectional view of a pressure relief valve on a liner, taken generally through the center of a pressure relief valve, across the liner, along line 3-3.

Details of the exemplary pressure relief valves are shown in the fragmentary and cross-sectional views of FIGS. 2 and 3. Pressure relief valves 14 each comprise a bottom layer 16 with a generally circular opening 18, which is aligned with an opening 20 in liner 12. Indeed, openings 18 and 20 may conveniently be formed in the same operation during the manufacture of the pressure relief valves. Affixed on top of bottom layer 16, by an adhesive 22 is a middle layer, or membrane, 24, which is thinner and more flexible than bottom layer 16, and does not have any opening. On top of membrane 24 are a pair of spaced apart top support ribs 26, adjacent either side of opening 18. Ribs 26 are affixed on top of membrane 24 by an adhesive 28, which may conveniently be the same as adhesive 22.

Each pressure relief valve 14 is releasably adhered on top of liner 12 by an adhesive 30, which has less adhesive, or peel, strength than adhesives 22 and 28. As the force of adhesion between pressure relief valve 14 and liner 12 will be less than the force of adhesion between the parts or layers of pressure relief valve 14, a pressure relief valve 14 may be removed from liner 12 without taking the valve apart. FIGS. 2 and 3 show a pressure relief valve of a particular configuration, and of particular, plastic, materials for purposes of illustration. This invention is not limited to this, or any other particular configurations or materials. For example, the pressure relief valve may be circular, without any top support ribs, or have parts of metal foil instead of plastic.

FIG. 1 shows a base unit 36, on which there is an unwinder 38 (only a fragmentary portion of which is shown in FIG. 1) containing a roll of liner 12 carrying pressure relief valves 14. Servo driven rollers 42, 44, and 46 move liner 12 with pressure relief valves 14 from unwinder 38 through valve lubricating unit 50 and then to valve applicator unit 52. A festoon of liner 12 is maintained by a biased dancer arm 56 which controls the slack and absorbs shock as the liner and valves are taken off unwinder 38. It will be appreciated by those skilled in the art that pressure relief valves 14 would in practice be carried along the entire length of liner 12 from unwinder 38, through valve lubricating unit 50, and up to valve applicator unit 52. However, for convenience of illustration, some of pressure relief valves 14 are not shown along the entire length of liner 12 up to the valve applicator unit in FIG. 1.

Valve applicator unit 52, which takes pressure relief valves 14, after oil or lubricant is applied, from liner 12 and puts the pressure relief valves on packaging is described in greater detail in pending U.S. patent application Ser. No. 11/435,525 filed May 17, 2006. Briefly, valve applicator unit 52 includes a pair of adjacent rollers 56, on the downstream side of valve lubricating unit 50, for guiding the liner with the lubricated pressure relief valves. Further downstream is a peeler bar assembly 60. The liner with the lubricated pressure relief valves passes across peeler bar assembly 60, over edge 62, to facilitate the removal of the adhesive backed pressure relief valve from the liner.

A valve applicator shaft 66 has a valve tamp applicator vacuum head 68 at one end. Head 68, under operation of a vacuum, releaseably carries the peeled pressure relief valve which has just passed over edge 62. A vacuum, provided by a vacuum generator (not shown) of the system, is selectively applied through vacuum lines (not shown) to head 68 to carry and releaseably retain pressure relief valve 14. Shaft 66 is carried by valve applicator unit 52 for axial movement. Valve applicator unit 52 also has a punch shaft 70 with a punch or piercing needle 72 at one end. Punch shaft 70 is also carried for axial movement.

Applicator shaft 66 and punch shaft 70 are, as shown in FIG. 1, carried by unit 52 with their respective axes at an angle to each other, such that head 68 and punch 72 are further apart than are the respective opposed ends of the shafts. A yoke 76 secures applicator shaft 66 and punch shaft 70 apart at a fixed distance proximate the applicator end of the applicator shaft and the punch end of the punch shaft. The fixed subassembly of the applicator shaft 66 and punch shaft 70 are also carried on valve applicator unit 52 for rotational movement, as illustrated by the arrows in FIG. 1, through a limited angle of both clockwise and counterclockwise rotation to define a set pivotal arc of movement. Thus, applicator shaft 66 and punch shaft 70 are selectively rotated or pivoted together through a defined arc, counterclockwise with respect to FIG. 1, in which punch 72 is pivoted out of register with a first position aligned with packaging (not shown) into another position. At the same time, applicator vacuum head 68 is simultaneously pivoted from its starting position, in which it is picking up a lubricated pressure relief valve, into register with the vacated first position of punch 72 to apply the lubricated pressure relief valve on the packaging in operating register with the opening that had just been made by punch 72. Reverse, or clockwise, rotation will then pivot punch 72 from the other position back into register with its first position, and applicator vacuum head 68 is simultaneously pivoted out of register with the first position of punch 72, back into the starting position of vacuum head 68 to pick up another lubricated pressure relief valve.

A pneumatic cylinder 80 provides a single driver for direct or indirect, selective engagement with an opposed end of either punch shaft 70 to drive the punch shaft to the punch extended position shown in FIG. 1 to pierce the packaging and make the opening, or applicator shaft 66 to drive the applicator shaft to an applicator vacuum head extended position to affix the lubricated pressure relief valve on the packaging in operating register with the opening. Each of punch shaft 70 and applicator shaft 66 are provided with a return spring 82 and 84, respectively. When pneumatic cylinder 80 engages punch shaft 70 and moves it axially to its extended position, spring 82 is compressed, as shown is FIG. 1. When pneumatic cylinder 80 is retracted, and punch shaft 70 is pivoted out of register with its first position, spring 82 will return punch shaft 70 back to a retracted position. Applicator shaft 66 and its spring 84, shown uncompressed in FIG. 1, operate in a similar manner with respect to pneumatic cylinder 80 when the applicator shaft is pivoted into register with the first position of punch shaft 70.

Upon setting up valve applicator unit 52, punch or piercing needle 72 needs to be adjusted in accordance with the packaging requirements. In operation, sensors that detect the presence of, for example, a filled package of coffee, emit a signal that starts the cycle of application. Punch or piercing needle 72 starts working to make the required opening in the package and tamp applicator vacuum head 68 picks up the lubricated pressure relief valve 14 that has just been peeled from liner 12. Applicator shaft 66 and punch shaft 70 are then pivoted as a unit, moving punch 72 out of register with the package and pneumatic cylinder 80, and pivoting applicator vacuum head 68 into the exact same position from which punch 72 has been removed, to apply the pressure relief valve to the packaging, utilizing the same adhesive 30 which had releaseably adhered pressure relief valve 14 to liner 12. At that time pneumatic cylinder 80 engages applicator shaft 66, and the vacuum is removed from head 68, to affix the lubricated pressure relief valve to the packaging in operating register with the opening that has just been made by punch 72. Applicator shaft 66 and punch shaft 70 are then returned as a unit to their previous positions, and the cycle repeats. After lubricated pressure relief valve 14 is removed from liner 12 on peeler bar assembly 60, empty liner 12 is taken up on a rewinder 88 on base unit 36, as shown in FIG. 1.

Valve oiling or lubricating unit 50 of the present invention is operated by a programmable logic controller ("PLC") 90. Packaging plant lines, such as lines in which the present invention is used, conveniently have sources (not shown) of vacuum and compressed air. Lubricating unit 50 is provided with dry, clean, 70 to 90 psi air from the plant supply. Solenoid valves 94 and 96, connected to the plant air and to the oil or lubricant head 100, are controlled by the PLC. Head 100 may be an EFD 781S series, model 781S-SS-14 spray or atomizing valve. The head dispenses an oil or lubricant 102 from a reservoir 104 into the pressure relief valves in a spray or atomized mist, as opposed to the prior art drop or dab of oil. When PLC 90 opens solenoid valve 94, the plant air provides pressure for head 100 to dispense an adjustable amount of lubricant in a spray through a nozzle 108 into the pressure relief valve. However, when PLC 90 also opens solenoid valve 96, plant air at a reduced pressure of about 10 psi, after passing through regulator 98, enters into head 100 to produce an atomized mist through nozzle 108, rather than a spray.

Oil or lubricant applicator 50, applies oil or lubricant to pressure relief valves 14 on liner 12 after they are taken off unwinder 38 and before they go to peeler bar assembly 60. A lubricant 102 comprising a suspension of graphite in liquid silicone has been found to be effective for pressure relief valves. However, it is important that the graphite to remain in suspension in the silicone, and not settle out of suspension. Accordingly, the present invention provides reservoir 104 of the graphite silicon suspension, in which the suspension is constantly recirculated. A pump 110 through line 112, both provides the lubricant to head 100 from reservoir 104, and recirculates the unused lubricant in reservoir 104 by constantly returning unused lubricant to the reservoir to provide a mixing or agitating action to keep the graphite in suspension.

Figure 4:
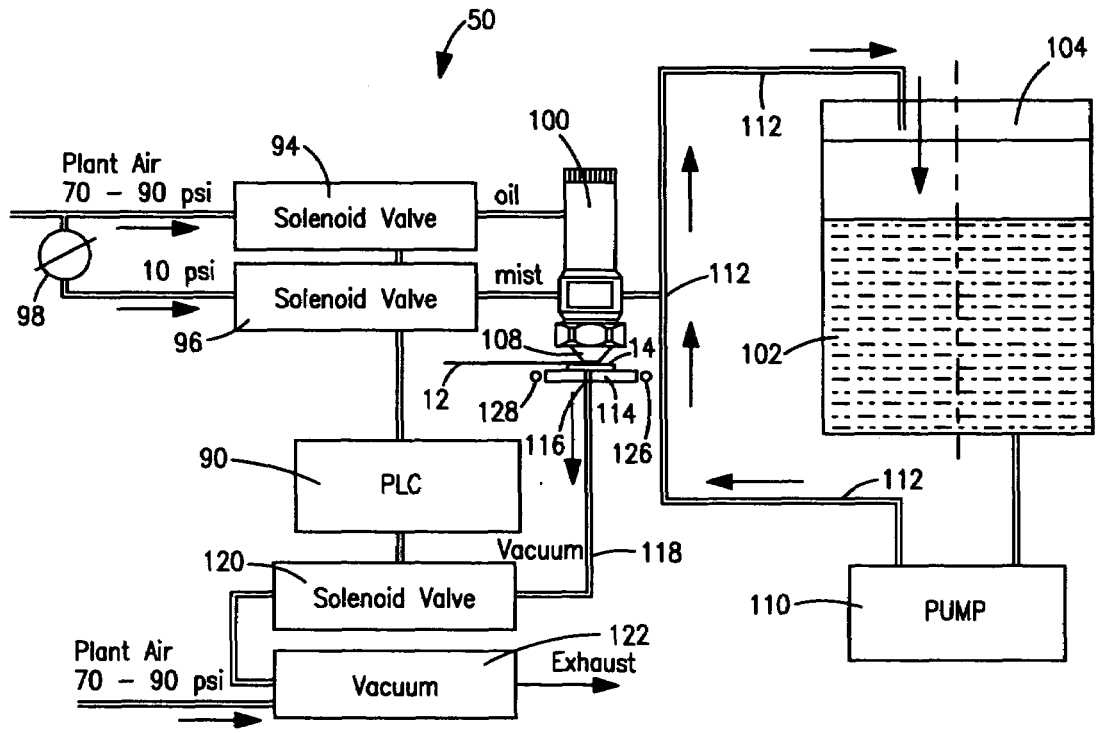
FIG. 4 is a schematic drawing of an embodiment of the valve lubricating unit of the present invention.
Figure 5:
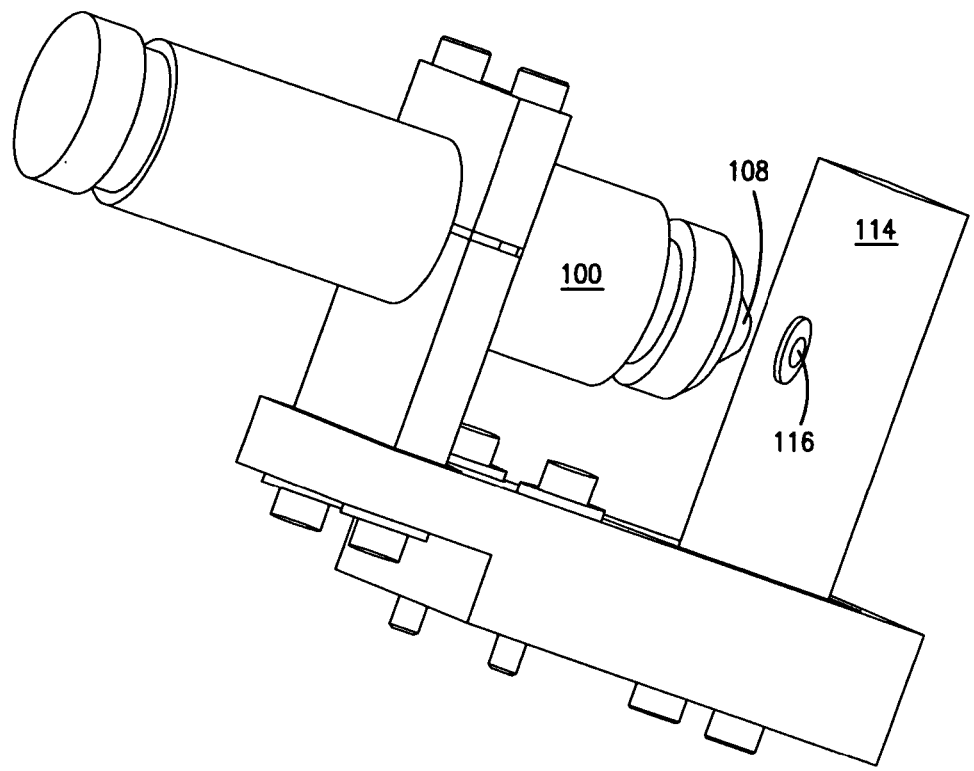
FIG. 5 is perspective view of the embodiment of the valve lubricating unit of the present invention showing the lubricant applicator and the vacuum plate.
Figure 6:
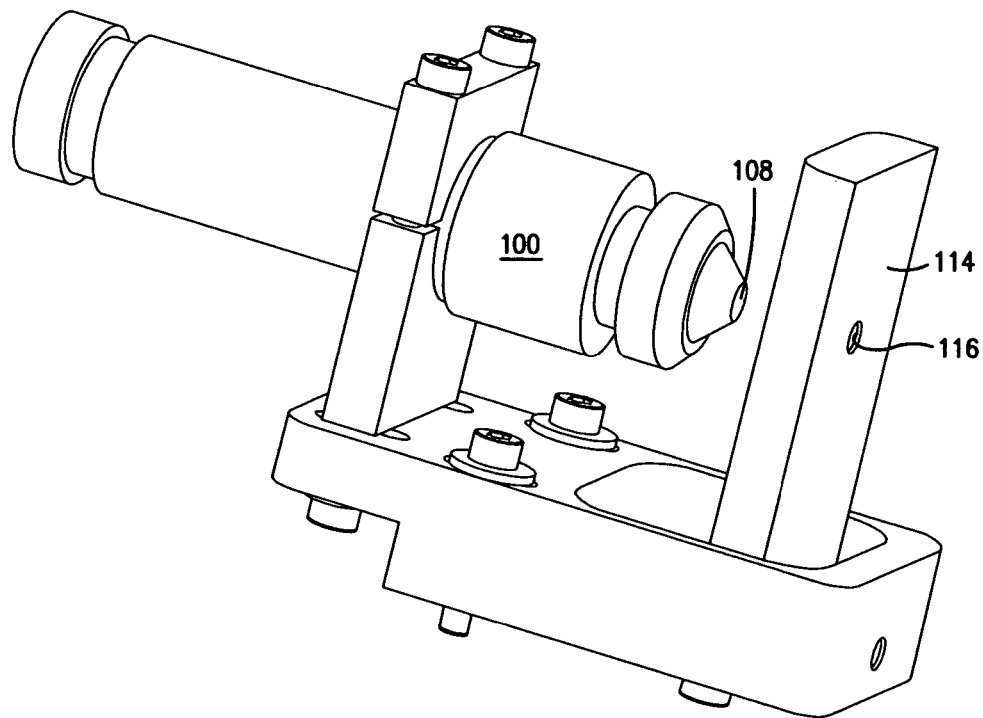
FIG. 6 is another perspective view of the embodiment of the valve lubricating unit of the present invention showing the lubricant applicator and the vacuum plate.

A vacuum plate 114, having an entrance end and an exit end, is spaced from the lubricant dispensing head nozzle 108. Vacuum plate 114 has a vacuum port 116 connected through a vacuum line 118, as schematically shown in FIG. 4, to solenoid 120, which is also controlled by PLC 90, to provide a vacuum on pressure relief valve 14 to temporarily separate or open the valve for the spray or atomized mist of lubricant 102 when valve hole 18, 20 is positioned under nozzle 108. A venturi vacuum unit 122 constantly provides vacuum to solenoid valve 120. To adjust the amount of the vacuum, a conventional regulator (not shown), may be installed on the incoming plant air supply line.

Pressure relief valves 14 are intermittently advanced by servo driven rollers 44 and 46 to position a pressure relief valve with pressure relief valve hole 18, 20 aligned with nozzle 108, and with membrane 24 positioned over vacuum port 116 in vacuum plate 114 between its entrance end and its exit end. Application of the vacuum to membrane 24 pulls it away from bottom layer 16 in proximity to hole 18 and provides for better dispersal of lubricant 102 sprayed, or preferably atomized, into hole 18 through hole 20 in liner 12.

To facilitate correct positioning of pressure relief valve 14 with respect to lubricant head nozzle 108 and vacuum port 116, more particularly to check that a pressure relief valve is positioned to pass onto vacuum plate 114, and to check that a pressure relief valve has in fact exited vacuum plate 114, a pair of optical, photoelectric eye, sensors 126 and 128 are positioned equal distances before and after vacuum plate 114, respectively. Sensor 126 proximate the entrance end of plate 114 checks for the leading edge of the pressure relief valve 14 about go onto the vacuum plate; sensor 128 proximate the exit end of plate 114 checks for the trailing edge of the pressure relief valve 14 that has just exited the vacuum plate. Since the pressure relief valves are at a constant pitch on the liner, setting sensors 126 and 128 apart as described provides a check that pressure relief valve 114 on the vacuum plate is properly, centrally positioned. Sensors 126 and 128 feedback, through appropriate software, to PLC 90, and rollers 44 and 46, to assist in proper positioning of pressure relief valves 14 on plate 114.

Vacuum may be constantly applied to vacuum plate 114 in the present invention. However, PLC 90 and solenoid valve 120 preferably provide for synchronized application and release of the vacuum to coincide with the application of lubricant. By applying the vacuum just before and/or during application of the lubricant, dispersal of the lubricant is improved, while removing the vacuum after the lubricant application facilitates advancement of the pressure relief valves from lubricating unit 50 to applicator unit 52.

Lubricating unit 50 may be used in a system such as that illustrated in FIG. 1, or in other systems comprising versions or modifications of the basic components of a base unit, an unwinder, a rewinder, rollers, electronic components, a vacuum generator, pneumatic components, and a valve applicator unit, other than those that have been shown and described.

Solely as an example, the present invention has been discussed in the context of coffee packaging although it can be readily used for the packing of other food and non-comestible products. While a particular embodiment of the invention has been shown and described, alternatives, variations and modifications will occur to those skilled in the art. It is intended in the appended claims to cover all such alternatives, variations and modifications that come within the true spirit and scope of the present invention.

What is claimed as new and desired to be secured by Letters Patent is:

1. A system for applying a pressure relief valve having opposed sides and multiple layers, including at least two layers that are not layers of adhesive, to packaging during the packaging process, including a valve lubricating unit, comprising:
   a lubricant applicator positioned to apply lubricant on one side of the pressure relief valve; and
   a vacuum applicator positioned on the other side of the same pressure relief valve, opposite the lubricant applicator and operating in cooperation with the lubricant applicator to temporarily separate the at least two layers that are not layers of adhesive of the same pressure relief valve at the same time a lubricant is being applied to that same pressure relief valve.

2. The system of claim 1 including a synchronizer for applying a vacuum to the pressure relief valve as the lubricant is applied to the pressure relief valve and for shutting off the vacuum applied to the pressure relief valve after the lubricant is applied to the pressure relief valve.

3. The system of claim 1 in which the lubricant applicator is a sprayer.

4. The system of claim 1 in which the lubricant applicator is an atomizer.

5. The system of claim 1 in which the lubricant comprises a suspension.

6. The system of claim 5 in which the lubricant comprises graphite in suspension.

7. The system of claim 6 in which the lubricant comprises graphite in suspension in liquid silicone.

8. A system for applying a pressure relief valve of multiple layers, including at least two layers that are not layers of adhesive, to packaging during the packaging process, including a valve lubricating unit, comprising:
   a lubricant applicator;
   a vacuum applicator positioned opposite the lubricant applicator; the same pressure relief valve positioned between the opposed lubricant applicator and the vacuum applicator at the same time;
   the vacuum applicator positioned on one side of the pressure relief valve, and operating in cooperation with the lubricant applicator to temporarily separate the at least two layers that are not layers of adhesive of the same pressure relief valve when a lubricant is being applied to that same pressure relief valve;
   the lubricant including graphite in suspension;
   a reservoir containing the lubricant; and
   a pump for recirculating the lubricant in the reservoir to provide a mixing or agitating action to keep the graphite in suspension.

9. The system of claim 8 further comprising:
   the vacuum applicator including a plate having an entrance end and an exit end;
   a line of pressure relief valves, including the pressure relief valve, moving across the plate;
   the pressure relief valve being positioned on the plate between the entrance end and the exit end;
   a sensor positioned proximate the entrance end for sensing the position of a pressure relief valve about to move onto the plate; and
   another sensor positioned proximate the exit end for sensing the position of a pressure relief valve that has moved past the plate.

10. The system of claim 9 including a synchronizer for applying a vacuum to the pressure relief valve as the lubricant is applied to the pressure relief valve and for shutting off the vacuum applied to the pressure relief valve after the lubricant is applied to the pressure relief valve.

11. The system of claim 8 including a synchronizer for applying a vacuum to the pressure relief valve as the lubricant is applied to the pressure relief valve and for shutting off the vacuum applied to the pressure relief valve after the lubricant is applied to the pressure relief valve.

12. A system for applying a pressure relief valve having opposed sides and multiple layers, including at least two layers that are not layers of adhesive, to packaging during the packaging process, including a valve lubricating unit, comprising:
   a lubricant applicator positioned to apply lubricant on one side of the pressure relief valve;
   a vacuum applicator positioned on the other side of the pressure relief valve, proximate and operating in cooperation with the lubricant applicator to temporarily separate the at least two layers that are not layers of adhesive of the pressure relief valve at the same time a lubricant is applied;
   the vacuum applicator including a plate having an entrance end and an exit end;
   a line of pressure relief valves, including the pressure relief valve, moving across the plate;
   the pressure relief valve being positioned on the plate between the entrance end and the exit end;
   a sensor positioned proximate the entrance end for sensing the position of a pressure relief valve about to move onto the plate; and
   another sensor positioned proximate the exit end for sensing the position of a pressure relief valve that has moved past the plate.

13. The system of claim 12 including a synchronizer for applying a vacuum to the pressure relief valve as the lubricant is applied to the pressure relief valve and for shutting off the vacuum applied to the pressure relief valve after the lubricant is applied to the pressure relief valve.

* * * * *